United States Patent
Soliman et al.

(10) Patent No.: US 6,690,917 B2
(45) Date of Patent: Feb. 10, 2004

(54) SYSTEM AND METHOD FOR AUTOMATIC DETERMINATION OF AZIMUTHAL AND ELEVATION DIRECTION OF DIRECTIONAL ANTENNAS AND CALIBRATION THEREOF

(75) Inventors: Samir S. Soliman, San Diego, CA (US); Ernest T. Ozaki, Poway, CA (US); Peter Gaal, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 44 days.

(21) Appl. No.: 10/071,928

(22) Filed: Feb. 5, 2002

(65) Prior Publication Data

US 2003/0092380 A1 May 15, 2003

Related U.S. Application Data

(60) Provisional application No. 60/334,675, filed on Nov. 15, 2001.

(51) Int. Cl.[7] .......................... H04B 7/185; H04B 1/38; H04M 1/00
(52) U.S. Cl. .................... 455/12.1; 455/13.2; 455/13.3; 455/362.1; 455/427; 455/430; 342/118; 342/133; 342/140; 342/352; 342/351.01
(58) Field of Search ................................. 455/403, 427, 455/428, 430, 456, 7, 11.1, 12.1, 13.1, 13.2, 13.3, 19, 25, 550, 560, 561, 562, 456.1, 456.2, 456.3, 562.1; 342/118, 128, 133, 139, 140, 350–356, 357.01–357.17

(56) References Cited

U.S. PATENT DOCUMENTS

| | | | | |
|---|---|---|---|---|
| 4,418,350 A | | 11/1983 | Rosen | 343/359 |
| 5,347,286 A | | 9/1994 | Babitch | 342/359 |
| 5,420,597 A | * | 5/1995 | Duncan | 343/703 |
| 5,835,057 A | | 11/1998 | Van Heyningen | 342/359 |
| 6,023,242 A | | 2/2000 | Dixon | 342/359 |
| 6,356,539 B1 | * | 3/2002 | Zuliani et al. | 370/320 |
| 6,429,816 B1 | * | 8/2002 | Whybrew et al. | 343/700 MS |
| 6,441,782 B2 | * | 8/2002 | Kelly et al. | 342/359 |
| 6,487,426 B1 | * | 11/2002 | Haber | 455/575.1 |
| 6,542,117 B1 | * | 4/2003 | Broughton | 342/359 |

FOREIGN PATENT DOCUMENTS

WO 9852301 11/1998 ........... H04B/7/155

* cited by examiner

*Primary Examiner*—Nay Maung
*Assistant Examiner*—Edan Orgad
(74) *Attorney, Agent, or Firm*—Philip Wadsworth; Charles D. Brown; Donald Kordich

(57) ABSTRACT

A system and method for automatically directing a communication antenna to point to a desired wireless communication transceiver, is presented herein. The system includes a position location receiver, which receives signals indicating the position location information of the antenna and a position location transmitter and a processing mechanism, which determines calibration information of the antenna. The calibration information is achieved by first establishing a reference vector between the location of the antenna and position location transmitter and establishing a vector reference space and then calculate the necessary elevation and azimuthal components, within the vector reference space, to identify the proper calibration of the antenna. Once the calibration information has been determined, an alignment mechanism automatically orients the antenna. The alignment mechanism then automatically directs the oriented antenna to point to the wireless transceiver, based on the directional location information of the wireless transceiver.

14 Claims, 4 Drawing Sheets

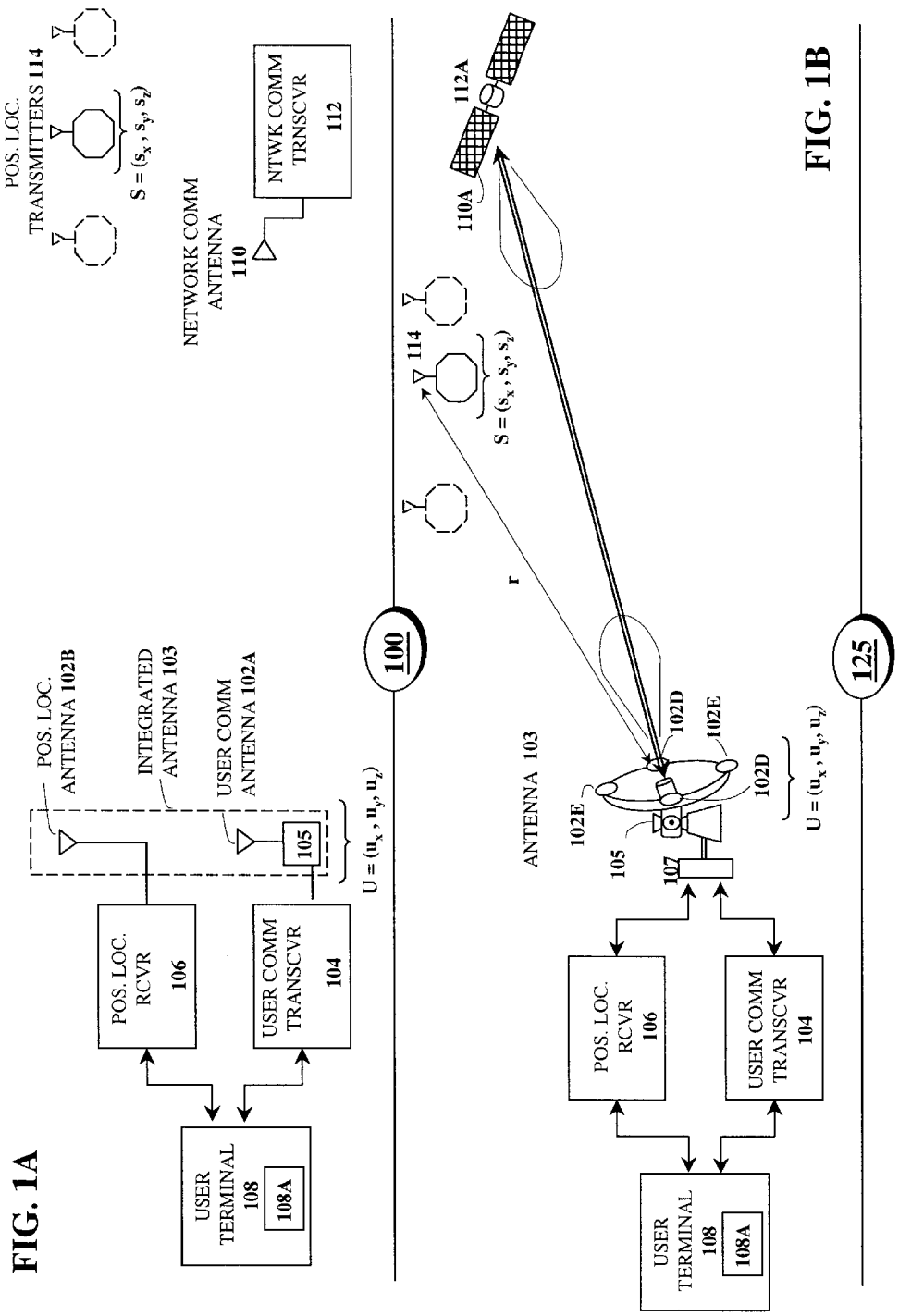

CALCULATION OF USER ANTENNA CALIBRATION INFORMATION

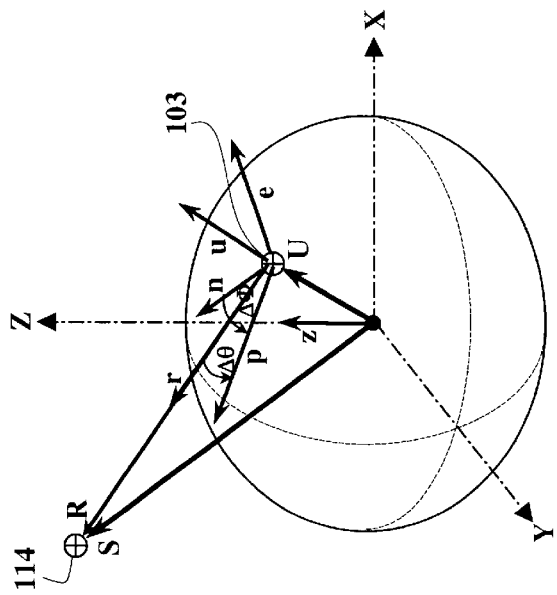

$$r = \left[\frac{S-U}{|S-U|}\right]$$

$$e = \left[\frac{z \times U}{|z \times U|}\right]$$

$$n = \left[\frac{U \times e}{|U|}\right]$$

offset elevation angle: $\Delta\theta = \sin^{-1}(r \cdot u)$ projection of r onto horizontal plane going through point U: $p = r - u(r \cdot u)$ offset azimuthal angle: $|\Delta\Phi| = \cos^{-1}\left[\frac{n \cdot p}{|p|}\right]$ $\text{sgn}(\Delta\Phi) = -\text{sgn}(e \cdot p)$

FIG. 2B

SYSTEM AND METHOD FOR AUTOMATIC DETERMINATION OF AZIMUTHAL AND ELEVATION DIRECTION OF DIRECTIONAL ANTENNAS AND CALIBRATION THEREOF

RELATED APPLICATIONS

This application claims priority to U.S. Provisional Application Ser. No. 60/304,735, filed on Jul. 10, 2001 and U.S Provisional Application Ser. No. 60/334,675 filed on Nov. 15, 2001.

BACKGROUND OF THE INVENTION

1. Reservation of Copyright

The disclosure of this patent document contains material, which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Field of the Invention

The present invention relates generally to the field of wireless communications and, in particular, to an automatic antenna directing system capable of accurately pointing a wireless communication directional antenna at a desired transceiver.

3. Description of Background Information

Recent advances in computer and cellular technologies, as well as the unprecedented growth of Internet-related applications, have resulted in placing great demands on conventional communication infrastructures to convey information at high transmission rates with increased reliability. For example, conventional infrastructures were based, at least in part, on statistical telephonic usage patterns. As users progressively spend more time on the Internet and tie up communication lines for longer periods of time, traditional usage patterns are no longer dependable. In many cases, such changes in usage patterns render conventional infrastructures inadequate.

In an effort to meet the demand for high transmission rates and provide users with high-speed Internet access, various wireline and wireless solutions have evolved. Wireline solutions, which include cable network services and Digital Subscriber Line (DSL) services, offer relief to subscribers having access to such services. Because of the relatively high capital expenditures and labor costs associated with providing connectivity and access to new regions, these services are far from ubiquitous.

On the other hand, wireless solutions are more cost effective and may service a wider range of subscribers. These wireless solutions are based on high-speed wireless data communication systems that employ either satellite-based data networks, such as, for example, DirecPC and StarBand services, or terrestrially-based data networks, such as cellular data networks.

Typically, these high-speed wireless data communication systems are power limited hence contemplate the use of a high-gain, narrow beam, highly-directional fixed antenna coupled to a user terminal to deliver information to a subscriber. As such, these fixed user antennas generally manifest stringent alignment requirements. That is, to ensure adequate communication capabilities, the user transmit or receive antennas need to accurately point in the direction of their counterpart antennas for both transmit and receive operations. For example, in high-speed satellite-based data communication systems link budgets have small margins, hence user antennas need to point to a satellite along specific elevation and azimuthal directions in order to maximize the gain of the received beam pattern and, thus, ensure optimal data transmission. Similarly, for high-speed terrestrially-based data communication systems, user antennas need to be aligned along specific elevation and azimuthal directions to point to the radiation center of a cellular antenna arrangement to ensure maximum possible signal-to-noise ratio. It will be appreciated that, although the specific location of both the user antenna and satellite antenna or cellular antenna may be known, such information does little to identify the exact orientation of the user antenna.

With this said, it is to be noted that most fixed antennas are susceptible to misalignment. Various factors, such as, poor initial installation, atmospheric conditions (e.g., wind), and antenna site construction may all contribute to antenna misalignment. Consequently, the misalignment of highly-directional user antennas may have a deleterious effect on the performance of high-speed wireless data communication systems.

Traditionally, the calibration and corrective re-alignment of fixed antennas require the dispatch of a technician to physically adjust the antenna in the direction containing the strongest signal. Such a process is not cost effective and fraught with inaccuracies as technicians often employ a trial-and-error approach to correct misalignments. Moreover, the process is time and task intensive, often requiring several hours of system down time before the misalignment can be corrected. This goes against the normal plug-and-go approach of most of today's applications.

SUMMARY OF THE INVENTION

Systems and methods consistent with the principles of the present invention, as embodied and broadly described herein, provide for an automatic antenna directing system capable of accurately pointing a wireless communication antenna at a desired transceiver.

In one embodiment, the system includes a position location receiver, which receives signals indicating position location information of the antenna and a position location transmitter. A processing mechanism coupled to the position location receiver determines calibration information of the antenna based on the location information of the antenna and the position location transmitter. An alignment mechanism coupled to the processing mechanism and the antenna, automatically orients the antenna, based on the calibration information, and automatically directs the oriented antenna to point to the wireless transceiver, based on the directional location information of the wireless transceiver.

Additional aspects of the present invention include determining the calibration information by first accurately pointing to the position location transmitter via a direction finding mechanism and then establishing a vector reference space. The necessary elevation and azimuthal components, within the vector reference space, are then calculated to identify the proper calibration of the antenna. Once the calibration information has been determined, an alignment mechanism automatically orients the antenna and, based on the directional location information of the wireless transceiver, alignment mechanism automatically directs the oriented antenna to point to the wireless transceiver.

BRIEF DESCRIPTION OF THE DRAWINGS

The above noted features and advantages of the present invention are further described in the detailed description which follows, with reference to the drawings, wherein like reference numerals represent similar parts of the present invention throughout the several views and wherein:

FIG. 1A illustrates a functional block diagram of an automatic antenna directing system, constructed and operative in accordance with an embodiment of the present invention;

FIG. 1B illustrates a functional block diagram of an automatic antenna directing system in a satellite network application, constructed and operative in accordance with another embodiment of the present invention;

FIG. 2B depicts a spatial vector reference diagram in accordance with an embodiment of the present invention.

DETAILED DESCRIPTION

Figure 1C:
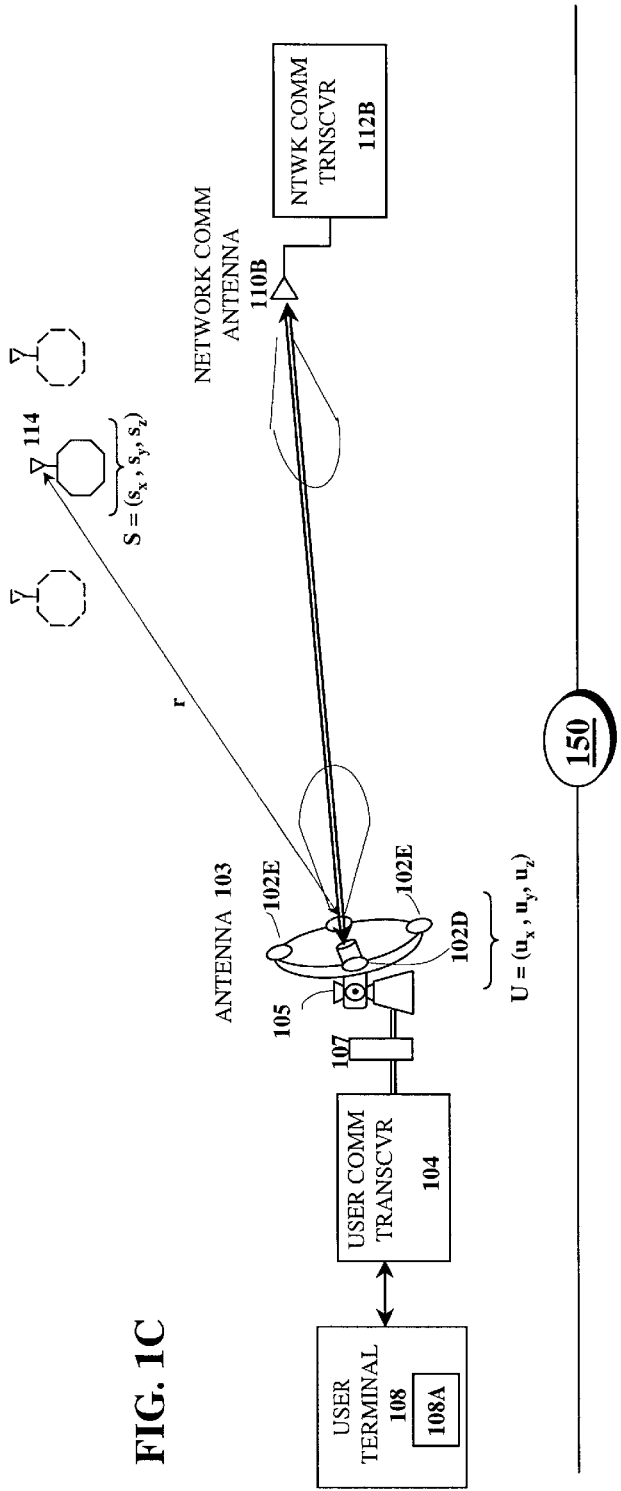
FIG. 1C illustrates a functional block diagram of an automatic antenna directing system in a terrestrial network application, constructed and operative in accordance with another embodiment of the present invention.

The following detailed description of the present invention refers to the accompanying drawings that illustrate exemplary embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

The embodiments described below may, instead, be implemented in many different embodiments of software, firmware, and hardware in the entities illustrated in the figures. The actual software code or specialized control hardware used to implement the present invention is not limiting of the present invention. Thus, the operation and behavior of the present invention will be described with the understanding that modification and variations of the embodiments are possible, given the level of detail present herein.

As will be described in greater detail below, a system for automatically directing a user antenna that accurately points to a desired communication transceiver may be employed to ensure adequate performance of high-speed data communication networks. In one embodiment, the system exploits the position location information between a position location receiver and a position location transmitter to generate a reference vector and a corresponding vector reference space. Because the position location information only contains location information and cannot render orientation information of the user antenna, the reference vector and vector reference space are used as a frame of reference to facilitate the deduction of orientation information (e.g., elevation and azimuthal direction information). This orientation information is then used to calibrate and properly orient the user antenna. Once the user antenna has been oriented, the user antenna may then be aligned to point to the desired communication transceiver based on the position location information of the transceiver or other methods. An antenna alignment mechanism then automatically adjusts the user antenna to point to the transceiver based on the user and the transceiver location information.

FIG. 1A illustrates an automatic antenna directing system 100, constructed and operative in accordance with an embodiment of the present invention. For purposes of illustration, many of the well-known features of wireless communications, such as, for example, filters, duplexers, amplifiers, and up/down converters that are ancillary to the present invention have been omitted.

Antenna directing system 100 may be used in conjunction with the high-speed wireless data communication services. As will be described in greater detail below, the high-speed wireless data communication services may be provided by either a satellite-based or terrestrially-based data communication network. Regardless of the network platform, system 100 employs a user terminal 108, which is coupled to a user communication antenna 102A. User antenna 102A communicates with a network communication transceiver mechanism 112 via a network communication antenna 110. User terminal 108 may include a processing mechanism 108A configured to execute program instructions residing in system memories. Such program instructions may control and/or manage various aspects of system 100, including, but not limited to, the processing of position location information, the determination of elevation and azimuthal direction information, and the generation of antenna orientation control signals.

System 100 further comprises a user communication transceiver mechanism 104 coupled to both user terminal 108 and user communication antenna 102A. Along the transmit path, user transceiver mechanism 104 is configured to modulate and up-convert the baseband data into a form suitable for subsequent radiation by user communication antenna 102A. On the receive path, user transceiver mechanism 104 is configured to demodulate and down-convert the signals received by user communication antenna 102A into baseband data.

User antenna 102A may also comprise alignment mechanism 105, capable of aligning antenna 102A along the elevation and azimuthal directions. Alignment mechanism 105 may comprise motorized components and associated circuitry to align antenna 102A along the proper directions once the elevation and azimuthal directional information have been resolved. To this end, alignment mechanism 105 may receive control signals from processing mechanism 108A to drive the motorized components and align antenna 102A along the proper directions.

System 100 may further comprise a position location receiver 106, such as, for example, a Global Positioning System (GPS) receiver or similar navigation/position location receiver, and an associated position location antenna 102B. Position location receiver 106 is configured to process and provide antenna 102B location information from at least one geostationary satellite capable of rendering position location services. Such information may be based on GPS or similar navigation/position location systems, which employ a plurality of position location transmitters (e.g., 3 or more) to yield accurate position location information. Consistent with navigation/position location systems, these transmitters may be configured as orbiting satellites (e.g., GPS satellites).

As indicated in FIG. 1A, user communication antenna 102A may also serve as position location antenna 102B or may be integrated with position location antenna 102B to form integrated antenna 103 that functions as both a communication and position location antenna. To this end, alignment mechanism 105 may be used in conjunction with the position location functionality to provide directional finding capabilities for tracking the position location transmitters.

FIG. 1B illustrates an automatic antenna directing system 125 operative with a high-speed, satellite-based data communication network, in accordance with an embodiment of the present invention. As indicated in FIG. 1B, antenna directing system 125 employs an integrated user antenna 103, which communicates, via a satellite network antenna 110A, with a satellite network transceiver 112A (e.g., transponder) to effect the transmission of the high-speed data. As such, user antenna 103 radiates a narrow transmit beam pattern for the transmission of data to satellite antenna 110A and collects a receive beam pattern from satellite antenna 110A for the reception of data. Although user antenna 103 is depicted as a microwave dish antenna, it will be appreciated that other antenna configurations may be employed.

Antenna directing system 125 further comprises a position location receiver 106, coupled to user antenna 103. As such, user antenna 103 may be configured to also receive position location information from a position location transmitter 114. As noted above, such information may be based on GPS or similar navigation/position location systems, employing a plurality of position location transmitters (e.g., 3 or more), which may configured as orbiting satellites (e.g., GPS satellites).

Position location transmitter 114 may be configured to furnish, on a predetermined basis, data detailing timing information and ephemeris data indicating the position location of transmitter 114. The position location of satellite transceiver 112A, as well as other information are parts of the configuration of the high-speed communication system, which are either known a priori or may be calculated from a set of GPS satellite transmitters similar to transmitter 114. Although the position location information based on transmitter 114 specifies the user antenna 103 and satellite transceiver 112A location, it will be appreciated that such information cannot identify or determine the orientation of antenna 103. To this end, user transceiver 104 determines relative antenna 103 location information, U. Transmitter 114 location information, S is broadcasted through the ephemeris navigation message of transmitter 114. For an instant in time, the antenna 103 and transmitter 114 location information may be defined as position vectors $U=(u_x, u_y, u_z)$ and $S=(s_x, s_y, s_z)$, respectively, in accordance with the well-known earth-centered, earth-fixed (ECEF) WGS-84 frame reference standard.

Antenna directing system 125 may further include a direction finding mechanism to track, and accurately point to, position location transmitter 114. Direction finding mechanism comprises an array of calibration antenna element pairs 102D, 102E, mounted on user antenna 103, and a beam-forming network 107, both used in conjunction with alignment mechanism 105. As will be described in greater detail below, calibration antenna element pairs 102D, 102E may be configured as circularly polarized micro-strip patch antennas or other antenna elements suitable for such purposes. Moreover, calibration antenna element pairs 102D, 102E may be mounted on diametrically opposite corners of antenna 103, having a boresight axis for the array formed by these elements coincident with the boresight of antenna 103. As such, antenna element pairs 102D, 102E may be used to generate two orthogonal radiation beam patterns. These patterns may then be processed to generate the sum and difference between the patterns, as indicated in FIG. 1D, to assist in identifying the elevation and azimuthal directions rendering the strongest signals from position location transmitter 114. Alignment mechanism 105 is then used to direct user antenna 103 to accurately point to position location transmitter 114, based on direction rendering the strongest signals.

Beam-forming network 107 is configured to process the transmit and receive beam patterns conveying signals of interest, including the two orthogonal radiation beam patterns generated by array of calibration antenna element pairs 102D, 102E. Beam-forming network 104 may comprise transform matrices and gain/phase adjusting elements as well as associated circuitry to achieve the desired beam patterns. Such circuitry may include, for example, combiners, splitters, and switching mechanisms, all of which have been omitted for the sake of brevity.

As will be described in greater detail below, system 125 exploits the position location information between antenna 103 and transmitter 114 to generate a reference vector and a corresponding vector reference space. The reference vector and vector reference space will be used as a frame of reference, allowing the deduction of orientation information (e.g., elevation and azimuthal direction information) to properly orient user antenna 103. The properly oriented user antenna 103 may then be automatically aligned to point to the satellite antenna 110A, by virtue of the satellite transceiver's 112A position location information.

Figure 1D:
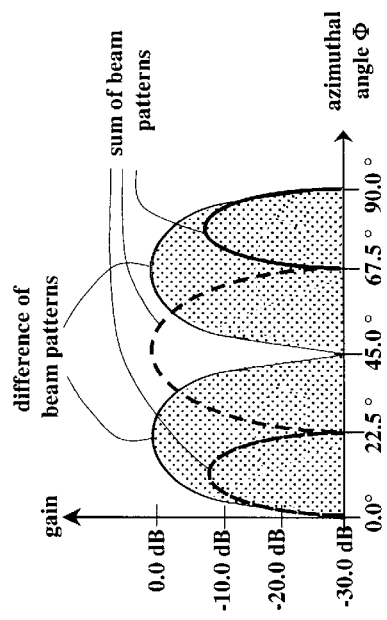
FIG. 1D illustrates beam patterns as functions of gain and azimuthal angles, in accordance with another embodiment of the present invention.

FIG. 1C illustrates an automatic antenna directing system 150 operative with a high-speed, terrestrially-based data communication network, in accordance with an embodiment of the present invention. Terrestrially-based data communication network may comprise, for example, a wireless data network, including, but not limited to, microwave line-of-sight networks and cellular networks. It is to be noted that some of the components in the terrestrially-based antenna directing system 150 are similar to the components identified in satellite-based antenna directing system 125 and are, therefore, denoted by like reference numerals. In the interest of brevity, some of these similar components will not be described further, it being understood that the lack of such description does not sacrifice any aspect of the present embodiment.

Antenna directing system 150 employs a user antenna 103, which communicates, via terrestrial antenna 110B, with a terrestrial communications transceiver 112B to affect the transfer of high-speed data. Terrestrial transceiver 112B and terrestrial antenna 110B may comprise, for example, a base station transceiver system and associated base station antenna arrangement. As such, user antenna 103 radiates a narrow transmit beam pattern for the transmission of data to terrestrial antenna 110B and collects a receive beam pattern from terrestrial antenna 110B for the reception of data.

System 150 also employs a position location receiver 106, coupled to user antenna 103, which may be configured to receive position location information from a position location transmitter 114. The location information of user antenna 103, transmitter 114, and terrestrial antenna 110B may be stored in a position location database. As noted above, with respect to antenna directing system 125, position location information cannot identify or determine the orientation of user antenna 103. User transceiver 104 determines antenna 103 location information, U, and receives transmitter 114 location information, S. For an instant in time, the antenna 103 and transmitter 114 location information may be defined as position vectors $U=(u_x, u_y, u_z)$ and $S=(s_x, s_y, s_z)$, respectively.

As indicated above with respect to system 125 and described in greater detail below, system 150 exploits the position location information between user antenna 103 and transmitter 114 to generate a reference vector and a corresponding vector reference space. The reference vector and vector reference space will be used as a frame of reference, allowing the deduction of orientation information (e.g., elevation and azimuthal direction information) to properly orient user antenna 103. The properly oriented user antenna 103 may then be automatically aligned to point to the terrestrial antenna 110B, by using the terrestrial transceiver's 112B position location information.

Figure 2A:
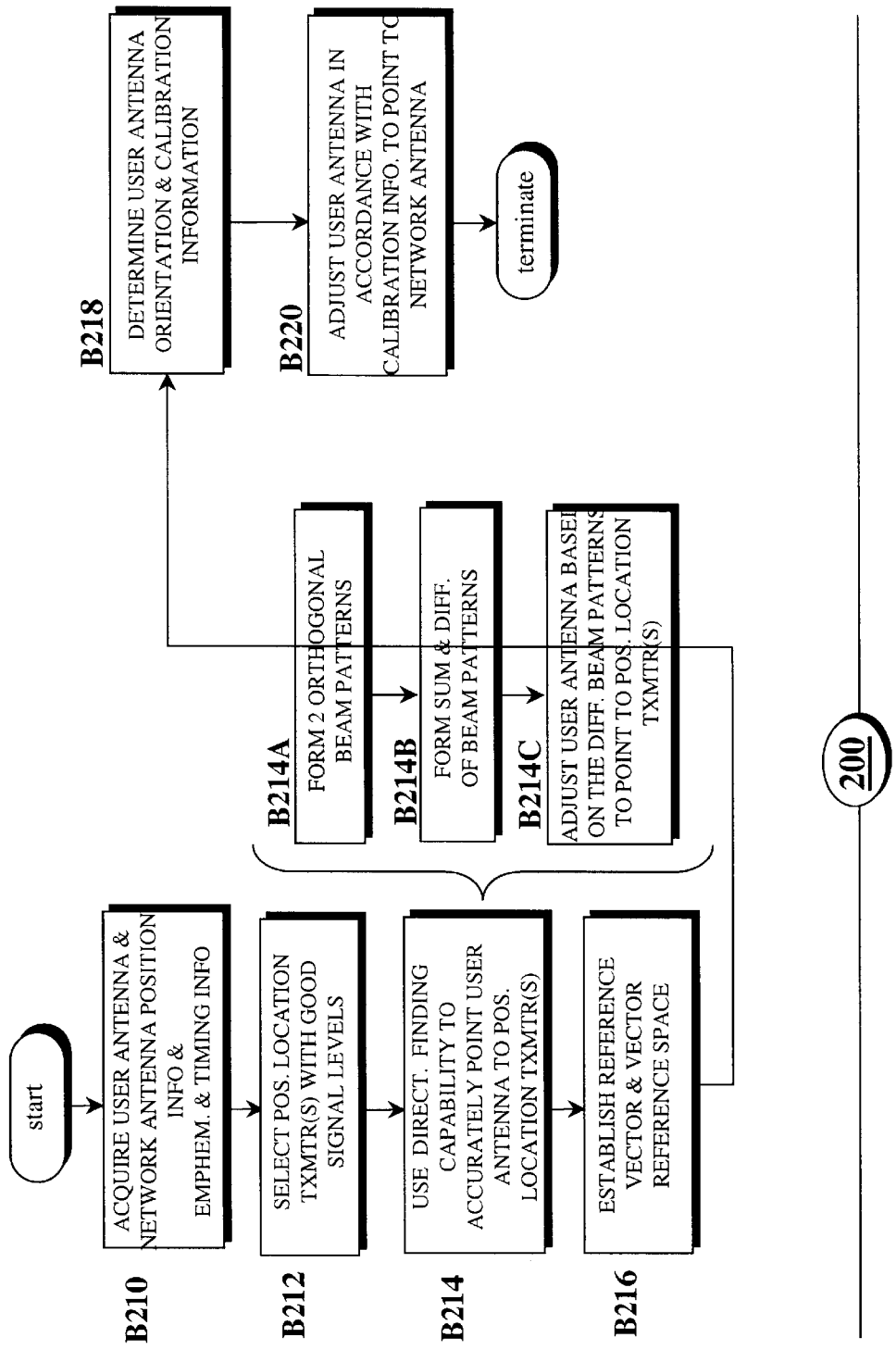
FIG. 2A depicts a functional flow chart diagram of an automatic directing process, constructed and operative in accordance with an embodiment of the present invention.

FIG. 2A is a functional flow diagram depicting automatic antenna directing process 200, constructed and operative in accordance with an embodiment of the present invention. In conjunction with the system embodiments presented above, process 200 operates to determine the necessary orientation information (e.g., elevation and azimuthal direction information) to properly orient user antenna 103. The properly oriented user antenna 103 may then be automatically aligned to point to the satellite or terrestrial antenna 110A, 110B by using the satellite transceiver 112A position location information or the terrestrial transceiver 112B position location information.

As indicated in block B210, process 200 initiates the acquisition of position location information with respect to user antenna 103, position location transmitter 114, and satellite transceiver antenna 110A or terrestrial transceiver antenna 110B. As noted above, well-known navigation systems, such as, for example, GPS, employ a plurality of position location transmitters that communicate timing information, user antenna 103 position location, network transceiver antenna 111A, 110B position location, and ephemeris data identifying position location of the transmitters in view. Accordingly, process 200 acquires the relevant information communicated by the various position location transmitters.

Upon receiving the relevant information communicated by the various position location transmitters, in block B212, process 200 selects at least one position location transmitter 114, from the plurality of transmitters, having acceptable signal conditions and/or signal levels. Such acceptable signal conditions may include, for example, a transmitter signal having signal-to-noise ratio (SNR) that meets a predetermined threshold. By doing so, process 200 ensures that it operates with only the strongest transmitter position location signals.

In block B214, process 200 utilizes the capabilities of the direction finding mechanism to precisely point user antenna 103 to the at least one position location transmitter 114. The precise pointing of user antenna 103 facilitates the establishment of vector reference space that will subsequently be used to accurately calibrate the orientation of user antenna 103.

In an exemplary implementation, process 200 implements the direction finding capabilities by initiating the formation and radiation of two orthogonal beam patterns from the array of calibration antenna element pairs 102D, 102E, as indicated in block B214A. One beam pattern is in the elevation plane while the other is in the azimuthal plane. Calibration antenna element pairs 102D, 102E may be mounted on diametrically opposite corners of antenna 103, having a boresight axis for the array formed by these elements coincident with the boresight of antenna 103. As such, the true north vector n for calibration antenna element pairs 102D, 102E is the same as that of antenna 103.

In block B214B, process 200 initiates the formation of the sum and difference of the two orthogonal beam patterns along each of the elevation and azimuthal planes by beam forming network 107. Typical sum and difference patterns in the azimuthal plane are plotted in FIG. 1B, as a function of gain and azimuthal angle $\Phi$. Plots for the elevation plane are similarly configured. One notable characteristic of the difference patterns is the steep null between the lobes, which represent the maximum gain of the beam patterns.

In block B214C, process 200 adjusts user antenna 103 relative to the steep null of the difference pattern for the elevation and azimuthal planes. Specifically, for both the elevation and azimuthal planes, user transceiver mechanism 104 tracks the gain of the difference pattern. Upon detecting the steep null within the respective difference patterns, mechanism 104 communicates the elevation angle $\theta$ and azimuthal angle $\Phi$ information associated with the null to processing mechanism 108A. Processing mechanism 108A then generates a first set of control signals based on the elevation and azimuthal angle $\theta$, $\Phi$ information to drive alignment mechanism 105 along the elevation and azimuthal planes in order to automatically align antenna 103 along the direction of optimal gain. In this manner, process 200 is able to exploit the direction finding capabilities to automatically and accurately direct user antenna 103 to point to the at least one position location transmitter 114.

Upon accurately pointing user antenna 103 to the at least one position location transmitter 114, process 200, in block B216, may then establish a precise and reliable vector reference space. By way of example, consider the attributes of the satellite-based data communication network depicted in FIG. 2C. In this illustrative example, the position location of user antenna 103 and the at least one position location transmitter 114 may be defined, relative to the earth's center, as position vectors $U=(u_x, u_y, u_z)$ and $S=(s_x, s_y, s_z)$, respectively. In response to identifying position vectors U, S, process 200 establishes a reference vector R, which points from the user antenna 103 location, U, to the transmitter 114 location, S. With position vectors U, S and reference vector R, process 200 may then establish a vector reference space, which serves as a frame of reference from which orientation information may be deduced.

The vector reference space comprises unit vector $u=U/|U|$, where $|U|$ denotes the magnitude of vector U. Vector reference space also comprises unit vector n, which points north from user location U, and unit vector e, which points east from U. Note that the three unit vectors u, n, and e are pair-wise orthogonal. The unit vector r pointing from U to S is defined as:

$$r=(S-U)/|S-U| \quad (1)$$

where $|S-U|$ denotes magnitude of S–U. Further, vector reference space also includes unit vector z, which is defined as pointing north from the center of the earth, $z=(z_x=0, z_y=0, z_z=1)$, i.e., parallel to the ECEF Z-axis.

It will be appreciated that the unit vector e pointing to the east from the user location U on the surface of the earth is given by:

$$e=(z \times U)/|z \times U| \quad (2)$$

where $z \times U$ denotes cross product of z and U. Similarly, it can be shown that the unit vector n pointing north from the user location U on the surface of the earth is given by:

$$n=U \times e/|U| \quad (3)$$

Equations (2) and (3) establish vector reference space comprising unit vector n, which points true north from user location U, and unit vector e, which points east. Note that Equations (2) and (3) are not valid when vectors u and z are parallel, i.e. when the user is located at either the North or South Pole Based on unit reference vector r and the vector reference space, process 200 is capable of deducing the orientation information necessary to calibrate and properly orient user antenna 103. The orientation information includes elevation direction and azimuthal direction components. In particular, process 200, in block B218, determines the elevation directional information necessary for orienting user antenna 103 in the proper elevation direction. This is achieved by calculating the offset elevation angle $\Delta\theta$, which defines the necessary angular adjustment of user antenna 103 along vector u. Offset elevation angle $\Delta\theta$ is related to the projection of vector r onto u and may be calculated as follows:

$$\Delta\theta = \sin^{-1}(r \cdot u) \quad (4)$$

where r·u is the scalar product between vectors r and u.

In block B216, process 200 also determines the azimuthal directional information necessary for orienting user antenna 103 in the proper azimuthal direction. Specifically, process 200 first calculates the projection p of vector r onto the horizontal plane going through point U. Since the horizontal plane going through point U is perpendicular to vector u, then projection p can be calculated as:

$$p = r - u(r \cdot u) \quad (5)$$

where u(r·u) is the product of u with the resulting scalar product of (r·u). Based on projection p, process 200 determines the azimuthal direction information by calculating the offset azimuthal angle $\Delta\Phi$, which defines the necessary angular adjustment of user antenna 103 along the true north vector n. As such, offset azimuthal angle $\Delta\Phi$ may be calculated as follows:

$$\Delta\Phi = \cos^{-1}[(n \cdot p)/|p|] \quad (6)$$

$$sign(\Delta\Phi) = sign(e \cdot p) \quad (7)$$

where n·p and e·p are the scalar products of n and p and e and p, respectively, and |p| denotes the magnitude of p.

Upon calculating the elevation and azimuthal direction information, process 200 achieves the orientation information necessary to properly calibrate and orient user antenna 103. In other words, by virtue of reference vector r, the vector reference space, offset elevation angle $\Delta\Phi$, and offset azimuthal angle $\Delta\Phi$, user antenna 103 may be adjusted and corrected to achieve proper orientation. Accordingly, in an exemplary embodiment, this may be achieved by having processing mechanism 108A generate a second set of control signals, based on offset elevation angle $\Delta\theta$ and offset azimuthal angle $\Delta\Phi$, to drive alignment mechanism 105 along the proper directions to orient user antenna 103.

The corrections based on offset elevation angle $\Delta\theta$ and offset azimuthal angle $\Delta\Phi$ will achieve the desired antenna orientation, if those corrections are done along the proper directions. This assumes that the physical azimuthal plane $P_a$ of alignment mechanism 105, i.e. the plane in which the physical antenna azimuthal adjustment takes place, is parallel to the true horizontal plane at user location U. This condition is equivalent to vector u being parallel to vector v, where v is a vector perpendicular to plane $P_a$. Even in the case when vectors u and v are not parallel, but when u, v and vector r all lie in the same plane, the corrections based on offset elevation angle $\Delta\theta$ and offset azimuthal angle $\Delta\Phi$, explained above, will achieve the desired orientation of user antenna 103. On the other hand, if vector v doesn't lie in the plane spanned by vectors u and r, then offset angle $\Delta\alpha$ measured between the projection of vector v and the projection of u on the plane $P_r$, where $P_r$ is a plane perpendicular to vector r. This offset angle $\Delta\alpha$ must be additionally corrected for in all subsequent antenna orientation operations. Said corrections may be carried out by processing mechanism 108A, by way of using appropriate coordinate transformations when converting the desired elevation and azimuthal movements to signals driving alignment mechanism 105.

As mentioned above, it may be necessary in some cases, i.e. when the initial parallel orientation of vectors u and v cannot be ensured, to determine offset angle $\Delta\alpha$. This may be done, for example, by repeating the operation of block B214 to align user antenna 103 to a second position location transmitter 114, or to the same position location transmitter as before but after it is moved to a different location, and compute $\Delta\alpha$ from the offset elevation angles $\Delta\theta$ and offset azimuthal angles $\Delta\Phi$, resulting from the two block B214 operations.

A more efficient method of determining $\Delta\alpha$ is when the alignment to the second position location transmitter 114 is aided by utilizing information obtained during alignment to the first position location transmitter. In a preferred embodiment, first, an appropriate second position location transmitter 114 is chosen, whose location is such that the vector pointing to it from user location U is not parallel to the vector pointing to the first position location transmitter. The position location information of the second position location transmitter 114 is translated into corresponding target elevation and azimuthal direction information valid at user location U. Process 200 then aligns antenna 103 along the target elevation and azimuthal direction information in an attempt to point it to the chosen second position location transmitter 114. If the second position location transmitter is found precisely at that direction, then $\Delta\alpha$ is zero and no further correction is needed. Otherwise, the second position location transmitter can be searched for by changing the azimuthal angle that is measured in plane $P_r$, where $P_r$ is a plane perpendicular to vector r, while keeping the elevation that is measured relative to $P_r$ constant. Once user antenna 103 is precisely aligned by this process to second position location transmitter 114, $\Delta\alpha$ will be readily determined as the azimuthal adjustment that took place in plane $P_r$, relative to the initial position. Note that since offset angle $\Delta\alpha$ is determined as an azimuthal difference in plane $P_r$, appointing a reference 'zero' azimuthal direction in plane Pr is not required. Also note that the best geometry for determining $\Delta\alpha$ is when the angle seen from user location U between the first and second position location transmitters is approximately 90°.

Finally, once user antenna 103 has been properly oriented, process 200 may then align antenna 103 to point to the desired network communication transceiver, i.e., satellite communication antenna 110A or terrestrial communication antenna 110B. Specifically, in block B220, process 200 uses the network transceiver antenna 110A. 110B position location information, which may be translated into corresponding target elevation and azimuthal direction information. Process 200 then aligns antenna 103 along the target elevation and azimuthal direction information to point to the desired network communication transceiver. In an exemplary embodiment, this may be achieved by having processor mechanism 108A generate a third set of control signals based on the target elevation and azimuthal direction information to drive alignment mechanism 105 to automatically adjust and align antenna 103 along the desired directions.

The separate alignments based on the second and third set of control signals, both explained above, may be done in a single step based on a single set of control signals. This single set is obtained with subtracting the control signals in the second set from the control signals in the third set.

The foregoing description of the embodiments of the present invention provides illustration and description, but is not intended to be exhaustive or to limit the invention to the precise form disclosed. Modifications and variations are possible consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment, may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed:

1. A system for automatically directing a communication antenna to point to a desired wireless communication transceiver, comprising:
   a position location receiver configured to receive signals indicating position location information of said antenna and at least one position location transmitter;
   a processing mechanism operatively coupled to said position location receiver and configured to determine calibration information of said antenna based on said location information of said antenna and said position location transmitter; and
   an alignment mechanism operatively coupled to said processing mechanism and said antenna and configured to automatically orient said antenna, based on said calibration information, and to automatically direct the oriented antenna to point to said wireless transceiver, based on directional location information of said wireless transceiver;
   a direction finding mechanism to point said antenna to said at least position location transmitter in order to determine said calibration information;
   wherein in response to pointing said antenna to said at least position location transmitter, said antenna location information is defined in terms of a position vector $U=(u_x, u_y, u_z)$ and said position location transmitter location information is defined in terms of a position vector $S=(s_x, s_y, s_z)$ and wherein said processing mechanism determines calibration information based on defining a vector reference space, in accordance with the following relationships:
   unit vector $u=U/|U|$, a unit vector defining a plane passing through U;
   unit vector $r=(S-U)/|S-U|$, a unit vector pointing from U to S;
   unit vector $z=(z_x=0, z_y=0, z_z=1)$, a unit vector pointing north from the center of the earth;
   unit vector $e=(z\times U)/|z\times U|$, a unit vector pointing true east from U; and
   unit vector $n=(U\times e)/|U|$, a unit vector pointing true north from U,
   wherein unit vectors u, n, and e are pair-wise orthogonal.

2. The system of claim 1, wherein said calibration information includes an elevation component $\Delta\theta$ and an azimuthal component $\Delta\Phi$ and said processing mechanism calculates said elevation component $\Delta\theta$ and said azimuthal component $\Delta\Phi$, in accordance with the following relationships:

$\Delta\theta=\sin^{-1}(r\cdot u)$, where $r\cdot u$ is the scalar product of vectors r and u;

$\Delta\Phi=\cos^{-1}[(n\cdot p)/|p|]$, where $n\cdot p$ is the scalar product of vectors n and p, and $|p|$ is the magnitude of p; and sign $(\Delta\Phi)=-$ sign $(e\cdot p)$, where $e\cdot p$ is the scalar products of e and p, wherein $p=r-u(r\cdot u)$, where p is the projection of vector r onto the horizontal plane going through point U and $u(r\cdot u)$ is the product of u with the resulting scalar product of $(r\cdot u)$.

3. The system of claim 2, wherein said processing mechanism generates a second set of control signals representing orientation adjustments to be performed by said alignment mechanism to automatically orient said antenna, based on said calibration information.

4. The system of claim 3, wherein said directional location information of said wireless transceiver comprises translating position location information of said wireless transceiver into transceiver elevation and azimuthal direction information.

5. The system of claim 4, wherein said processing mechanism generates a third set of control signals representing directional adjustments to be performed by said alignment mechanism, based on said transceiver elevation and azimuthal direction information, to automatically direct said oriented antenna to point to said wireless transceiver.

6. A system for automatically directing a communication antenna to point to a desired wireless communication transceiver, comprising:
   a position location receiver configured to receive signals indicating position location information of said antenna and at least one position location transmitter;
   a processing mechanism operatively coupled to said position location receiver and configured to determine calibration information of said antenna based on said location information of said antenna and said position location transmitter; and
   an alignment mechanism operatively coupled to said processing mechanism and said antenna and configured to automatically orient said antenna, based on said calibration information, and to automatically direct the oriented antenna to point to said wireless transceiver, based on directional location information of said wireless transceiver; and
   a direction finding mechanism to point said antenna to said at least position location transmitter in order to determine said calibration information, wherein said directional finding mechanism comprises,
      a beam-forming network operatively coupled to said antenna and configured to process radiated transmit and receive beam patterns,
      a transceiver mechanism operatively coupled to said beam-forming network and configured to process signals to be transmitted to said beam-forming network and to process signals received from said beam-forming network, and
      an array of calibration antenna elements disposed on said antenna, said array of calibration antenna elements forming two orthogonal radiation beam patterns such that one of said radiation beam patterns is formed along the elevation plane and the other of said radiation beam patterns is formed along the azimuthal plane,
      wherein said beam-forming network forms said two orthogonal radiation beam patterns for each of the elevation and azimuthal planes, a sum beam pattern, representing a combination of said radiation beam patterns along one plane, and a difference beam pattern, representing a difference between said radiation beam patterns along the same plane, wherein said transceiver mechanism tracks said difference beam pattern for said elevation plane and azimuthal plane to determine the maximum gain along each of the planes and determine the respective elevation and azimuthal direction information associated with the maximum gain, wherein said transceiver mechanism communicates said elevation and azimuthal direction information to said processing mechanism;

wherein in response to receiving said elevation and azimuthal direction information associated with the maximum gain, said processing mechanism generates a first set of control signals, representing adjustments to be performed by said alignment mechanism, to automatically direct said antenna to point to said at least position location transmitter.

7. The system of claim 6, wherein said at least one position location transmitter is selected from a plurality of position location transmitters, based on having a signal level that meets a predetermined threshold.

8. A method of automatically directing a communication antenna to point to a desired wireless communication transceiver, comprising:

acquiring, by a position location receiver, position location information of said antenna and at least one position location transmitter;

determining, by a processing mechanism, calibration information of said antenna based on said location information of said antenna and said position location transmitter;

orienting, said antenna, by an alignment mechanism, based on said calibration information; and directing the oriented antenna, by said alignment mechanism, to point to said wireless transceiver, based on directional location information of said wireless transceiver;

pointing said antenna to said at least position location transmitter, by a direction finding mechanism, to determine said calibration information;

wherein in response to pointing said antenna to said at least position location transmitter, said antenna location information is defined in terms of a position vector $U=(u_x, u_y, u_z)$ and said position location transmitter location information is defined in terms of a position vector $S=(s_x, s_y, s_z)$ and wherein said processing mechanism determines calibration information based on defining a vector reference space, in accordance with the following relationships:

unit vector $u=U/|U|$, a unit vector defining a plane passing through U;

unit vector $r=(S-U)/|S-U|$, a unit vector pointing from U to S;

unit vector $z=(z_x=0, z_y=0, z_z=1)$, a unit vector pointing north from the center of the earth;

unit vector $e=(z \times U)/|z \times U|$, a unit vector pointing true east from U; and unit vector $n=(U \times e)/|U|$, a unit vector pointing true north from U, wherein unit vectors u, n, and e are pair-wise orthogonal.

9. The method of claim 8, wherein said calibration information includes an elevation component $\Delta\theta$ and an azimuthal component $\Delta\Phi$ and said processing mechanism calculates said elevation component $\Delta\theta$ and said azimuthal component $\Delta\Phi$, in accordance with the following relationships:

$\Delta\theta=\sin^{-1}(r \cdot u)$, where $r \cdot u$ is the scalar product of vectors r and u;

$\Delta\Phi=\cos^{-1}[(n \cdot p)/|p|]$, where $n \cdot p$ is the scalar product of vectors n and p, and $|p|$ is the magnitude of p; and sign $(\Delta\Phi)=-$ sign $(e \cdot p)$, where $e \cdot p$ is the scalar products of e and p, wherein $p=r-u (r \cdot u)$, where p is the projection of vector r onto the horizontal plane going through point U and u $(r \cdot u)$ is the product of u with the resulting scalar product of $(r \cdot u)$.

10. The method of claim 9, further including, generating, by said processing mechanism, a second set of control signals representing orientation adjustments to be performed by said alignment mechanism to automatically orient said antenna, based on said calibration information.

11. The method of claim 10, wherein said directional location information of said wireless transceiver comprises translating position location information of said wireless transceiver into transceiver elevation and azimuthal direction information.

12. The method of claim 11, further including, generating, by said processing mechanism a third set of control signals representing directional adjustments to be performed by said alignment mechanism, based on said transceiver elevation and azimuthal direction information, to automatically direct said oriented antenna to point to said wireless transceiver.

13. A method of automatically directing a communication antenna to point to a desired wireless communication transceiver, comprising:

acquiring, by a position location receiver, position location information of said antenna and at least one position location transmitter;

determining, by a processing mechanism, calibration information of said antenna based on said location information of said antenna and said position location transmitter;

orienting, said antenna, by an alignment mechanism, based on said calibration information;

directing the oriented antenna, by said alignment mechanism, to point to said wireless transceiver, based on directional location information of said wireless transceiver;

pointing said antenna to said at least position location transmitter, by a direction finding mechanism, to determine said calibration information, wherein said directional finding mechanism comprises, a beam-forming network operatively coupled to said antenna and configured to process radiated transmit and receive beam patterns, a transceiver mechanism operatively coupled to said beam-forming network and configured to process signals to be transmitted to said beam-forming network and to process signals received from said beam-forming network, and an array of calibration antenna elements disposed on said antenna, said array of calibration antenna elements forming two orthogonal radiation beam patterns such that one of said radiation beam patterns is formed along the elevation plane and the other of said radiation beam patterns is formed along the azimuthal plane;

forming, by said beam-forming network, a sum beam pattern, representing a combination of said orthogonal radiation beam patterns along one plane, and a difference beam pattern, representing a difference between said orthogonal radiation beam patterns along the same plane;

tracking, by said transceiver mechanism, said difference beam pattern for said elevation plane and azimuthal plane to determine the maximum gain alone each of the planes and determine the respective elevation and azimuthal direction information associated with the maximum gain;

communicating, by said transceiver mechanism, said elevation and azimuthal direction information to said processing mechanism; and generating, by said processing mechanism, a first set of control signals representing adjustments to be performed by said alignment mechanism to automatically direct said antenna to point to said at least position location transmitter, in response to receiving said elevation and azimuthal direction information associated with the maximum gain.

14. The method of claim 13, wherein said at least one position location transmitter is selected from a plurality of position location transmitters, based on having a signal level that meets a predetermined threshold.

* * * * *